April 15, 1969  I. BERMAN ET AL  3,438,113
SHORT TIME ELEVATED TEMPERATURE AUTOFRETTAGE
Filed Nov. 25, 1966
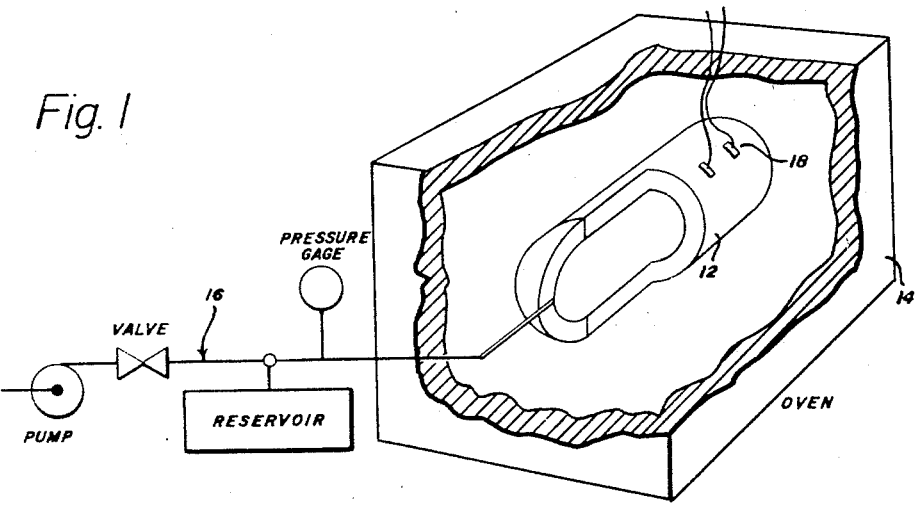
Fig. 1
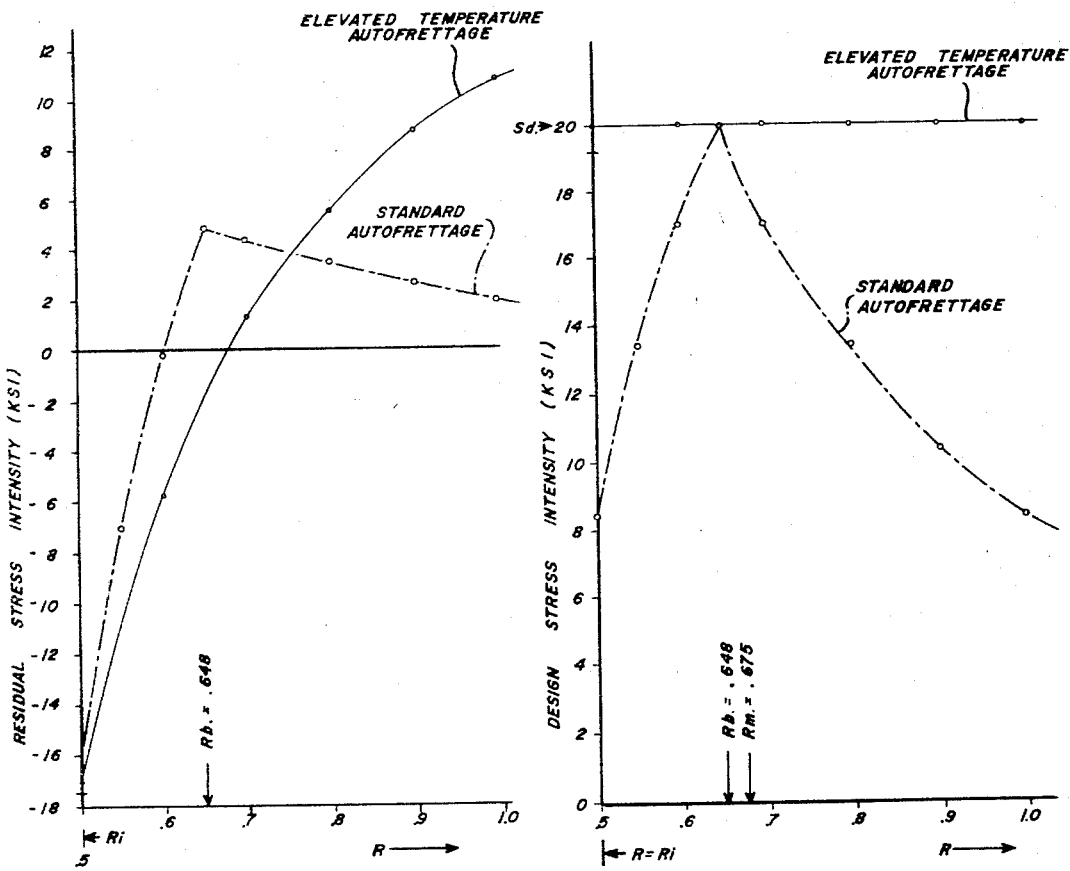
Fig. 2
Fig. 3
INVENTOR.
IRWIN BERMAN
DAVID H. PAI
Richard H. Thomas
ATTORNEY United States Patent Office
3,438,113
Patented Apr. 15, 1969

3,438,113
SHORT TIME ELEVATED TEMPERATURE AUTOFRETTAGE
Irwin Berman, Bronx, N.Y., and David H. Pai, Metuchen, N.J., assignors to Foster Wheeler Corporation, Livingston, N.J., a corporation of New York
Filed Nov. 25, 1966, Ser. No. 596,866
Int. Cl. B23p 11/02; B21d 3/00
U.S. Cl. 29—404          7 Claims The present invention relates to the fabrication of pressure vessels, and in particular to improvements in the autofrettage of pressure vessels.

For purposes of this application, the term "stress intensity" is defined as the maximum difference of the principal stresses, longitudinal, circumferential and radial, at a point in a vessel wall (ASME Boiler and Pressure Vessel Code, section III, page 13). It is equal to twice the maximum vessel shear stress at that point. The term "autofrettage stress intensity" is defined as the stress intensity which exists at any point in the thickness of the vessel at fabrication autofrettage pressure and temperature. "Residual stress intensity" relates to the stress intensity existing in the vessel wall following fabrication and release of fabrication pressure and temperature. "Design stress intensity" concerns the operating stress intensity in the vessel wall at design operating pressure and temperature (ambient or otherwise).

Also, for the purposes of this application, the terms "elastic flow" and "plastic flow" will be used indicating the nature of the flow of metal under stress. The molecular movement in metals is elastic up to the point where slipping occurs in the grains of the material, at which point, the flow is plastic.

Autofrettage is a well-known process and includes the procedure of expanding an inner layer or stratum of metal (in a multi-layer or thick walled single layer vessel) beyond its elastic limit so that a permanent set or deformation of the inner layer or stratum takes place; i.e., plastic flow in the stratum occurs. Following release of the expanding pressure, the inner layer or stratum is under circumferential compression, restrained by the outer layer or stratum under circumferential tension. Broadly, autofrettage can be defined as the application of one stress intensity distribution to the vessel wall (to the point of overloading and plastic flow of metal) and removal of another stress intensity distribution with release of fabrication pressure. The release usually allows only an elastic or resilient contraction of the vessel or sometimes the release allows a different elastic plastic contraction, leaving a residual stress intensity distribution in the vessel wall.

Autofrettage may be very beneficial in the case of thick walled cylinders subjected to large internal pressures because of the large gradient of stress experienced through the thickness of the vessel wall. As will be shown, it provides a means for more efficient use of outer layers or strata of the vessel wall which normally would be understressed when subjected to design pressures.

As further background the present invention, one of the earliest uses for autofrettage was in the fabrication of gun barrels, although the purpose in autofrettaging was to obtain dimensional stability of the gun barrel rather than added strength. The gun barrel wall was stressed in fabrication beyond its elastic limit so that there was a plasitc flow of metal in essentially the entire thickness of the barrel, establishing a residual stress intensity pattern through the gun barrel wall.

The basic explanation of this is simple. During initial pressurizing, as the inner stratum of the gun barrel wall becomes plastic (i.e. beyond the elastic limit), the point of maximum stress intensity in the barrel is immediately outside of or beyond this stratum. As the pressure is increased, the point of maximum stress intensity moves outwardly in the barrel until, just prior to bursting, the point is located near the outside surface of the barrel, with the stress intensity being then least at the inside surface of the barrel.

On release of the pressure within the barrel, there is a uniform shrinking of the barrel as a result of its elasticity, except that a permanent deformation or set has been established, and the barrel wall is provided with a residual stress intensity pattern, throughout its thickness, which as with the stress intensity pattern established prior to release of internal pressure, has a maximum stress intensity near the outside of the barrel wall.

Design pressure, resulting from the explosion within the barrel, creates a stress intensity pattern the maximum intensity of which is near the inside wall of the barrel. These two stress intensity patterns combined create a stress intensity which achieves dimensional stability in the gun barrel.

With respect to the autofrettage of pressure vessels, the autofrettage conventionally is carried out to the extent that only the inner one third thickness of the vessel is expanded to the point of plastic flow, creating a residual stress pattern wherein the maximum stress intensity is about a third of the way through the vessel wall. It has been determined in practice and may be verified analytically that plastic flow to about one third of the thickness creates the best residual stress distribution for subsequent design pressurization that may be obtained by standard autofrettage. At design pressure, the stress vs. vessel thickness curve, will still have a configuration with a large portion of the vessel thickness near the outside wall highly understressed, thereby rendering the vessel relatively inefficient in terms of metal thickness required to retain a particular design pressure. In addition, standard autofrettage today for pressure vessels requires fabrication pressures which are high.

As an alternative method for obtaining a more uniform residual stress intensity pattern in the thickness of a vessel, it is known to shrink fit one vessel layer within another. There are many ways of doing this, but each method relies on the creation of an interference fit between the outside diameter of one layer and the inside diameter of the next layer in contact. These methods require machining to extremely close tolerances, and for cylinders of large length, especially thin cylinders the tolerance problem is unsolvable. If heating is used for assembly, the heating may be detrimental to the materials involved if a large overlap is required.

Autofrettage has been used with shrink fit, and in theory, could provide a reasonably uniform stress intensity distribution level. In practice, good results for high pressure vessels have been difficult to achieve.

The present invention resides in the discovery of a unique series of relationships and sequence of steps whereby the above disadvantages are overcome.

Accordingly, it is an object of the present invention to provide an autofrettage method by which a significant increase in allowable design pressure of a pressure vessel is obtained with a limited autofrettage pressure. As a corollary, it is an object of the invention to provide a method for autofrettage of a vessel in which a lower autofrettage pressure can be used.

It is a further object to increase material utilization or efficiency in a thick-walled or multi-layer cylindrical pressure vessel.

In accordance with the invention, short time elevated temperature autofrettage is the application of a predetermined load or pressure to the inside of the vessel for autofrettage which is approximately or substantially equal to vessel design pressure, while simultaneously heating the vessel approximately to that temperature at which the yield strength of the vessel metal is reduced to vessel design stress intensity. The pressure and temperature are held for a short period of time, essentially until the vessel outside radius stops increasing at a measurable rate. Although one may wish to determine a design pressure for a given vessel, generally the first dimensions are ascertained from a predetermined design pressure in accordance with the equation $$p_2 = S_d \log_e 1/R_i$$

wherein:

$R_i$ = ratio of vessel inside radius to vessel outside radius; and
$S_d$ = vessel design stress intensity It was discovered that the application of the design pressure at the elevated temperature produced on release of load a residual stress intensity distribution which under design load established a uniform stress intensity through the vessel wall.

The two major advantages of short time elevated temperature autofrettage as compared to the usual autofrettage by high pressure at ambient temperature are as follows:

(1) The residual stress distribution may be created by the use of a lower internal pressure than for the usual autofrettage.

(2) The residual stress pattern created by short time elevated temperature autofrettage may be made more favorable for the subsequent use of the vessel than that created by the usual autofrettage. Or, stated another way, for a particular pressure vessel if it was correctly short time elevated temperature autofrettaged, it may be subsequently loaded with a higher internal pressure than if it were autofrettaged by the usual means if both cases were designed by the same stress criterion.

The invention and advantages thereof will become apparent from the following description, with reference to the accompanying drawings, in which FIGURE 1 is a schematic partial section view of a system for short time elevated temperature autofrettage of a vessel in accordance with the invention;

FIGURE 2 is a graph showing the variation of residual stress intensity with radius for various systems; and FIGURE 3 is a graph showing the variation of design stress intensity with radius for various systems.

It has been mentioned that autofrettage is the application of an internal pressure sufficient to obtain plastic flow of at least a part of the metal of a vessel wall.

FIG. 1 illustrates schematically a system by which autofrettage can be carried out with the application of temperature sufficient to obtain a yield strength equal to the design stress intensity.

Referring to FIG. 1, the vessel 12 to be autofrettaged is placed in an oven 14 and is subjected to a predetermined desired temperature, in the order of 1000° F. depending, however, on the metal being used. A suitable pump valve and reservoir arrangement 16 subjects the interior of the vessel to the predetermined short time elevated temperature autofrettage pressure. High temperature strain gages 18 indicate the rate of expansion of the vessel wall, and in general, the pressure and temperature are held for a short time, perhaps a matter of minutes, until the vessel outside radius stops increasing at a measurable rate. The vessel 12 may be a solid thick-walled vessel, as shown, or a multi-layer vessel.

In operation, a predetermined design pressure may be specified, for which the vessel is to be fabricated, or it may be desired to determine a design pressure for a given vessel autofrettaged in accordance with the invention. In either event, the design pressure $p_2$ is related to vessel dimension in accordance with the equation $$p_2 = S_d \log_e 1/R_i$$

wherein:

$R_i$ = ratio of vessel inside radius to vessel outside radius; and
$S_d$ = vessel design stress intensity The vessel design stress intensity can be obtained for a particular material from the above mentioned ASME Boiler and Pressure Vessel Code.

With the selection of vessel radii and/or design pressure, the parameter of temperature is that at which the yield strength of the vessel metal is reduced to vessel design stress intensity. This temperature is determinable from the ASTM Technical Publication No. 180, 1955, Elevated Temperature Properties of Carbon Steels, and can also be obtained from other sources.

The following example illustrates the above principles of the invention:

*Example I*

A vessel is constructed of ASTM 201-Grade B steel having the following material specifications:

$S_d$ (design stress intensity) = 20,000 p.s.i. (ASME code)
$Y$ (yield strength at ambient temperature) = 37,000 p.s.i.
$t$ (temperature at which the yield strength $Y$ equals design stress intensity $S_d$) = 1000° F.

The last two values were obtained from the ASTM Technical Publication. Design pressure is specified at 15,000 p.s.i.

Substituting the appropriate values in the equation $$p_2 = S_d \log_e 1/R_i$$

there is obtained $$15{,}000 \text{ p.s.i.} = 20{,}000 \log_e 1/R_i$$
$$R_i = 0.473$$

Following construction, the vessel is autofrettaged at 15,000 p.s.i. and 1000° F. for a matter of minutes, perhaps five, until strain gages or the vessel outside wall show no further measurable rate of strain increase. The pressure and temperature are then lowered to ambient.

It was stated that an objective of the invention was to obtain a residual stress distribution in the cylinder wall which, on exposure of the vessel to design pressure, results in a substantially uniform stress distribution through the vessel wall, and thereby, maximum utilization of the vessel material. Generally speaking, the residual stress distribution will show a maximum stress at the outside of the vessel with the stress reducing to zero about halfway through the vessel wall, the inner strata or layers of the vessel wall being in compression. This is shown in FIG. 2 in the dashed line labeled "Elevated Temperature Autofrettage."

Looking more closely at FIG. 2, it can be seen that the residual stress from elevated temperature autofrettage reaches a maximum (in K s.i.) of about 10 at the outside of the vessel where R (the ratio of the radius in question divided by the outside radius of the vessel) eqauls one, and reduces rapidly until at the point where $R = R_i = 0.5$, the residual stress is about minus 17 K s.i. This can be compared with standard autofrettage (using the optimum autofrettage pressure in each case) where the residual stress intensity reaches a maximum of about 5 K s.i. at $R = R_b = .648$ decreasing to the outside of the vessel. $R_b$ can also be described as the boundary for elastic plastic flow, beyond which the movement is all elastic. Comparing the two curves, it is apparent that from elevated temperature autofrettage, a much larger portion of the vessel is under compression with the tension being greatest at the outside of the vessel.

FIG. 3 now illustrates the advantages of the invention. On the application of design pressure to the vessel, the stress intensity in the vessel wall follows the solid line for the vessel which has been subjected to elevated temperature autofrettage, as compared to the partially dotted line for the standard autofrettaged vessel. The latter has a maximum stress intensity at the point $R_b = .648$ and a sharply reducing stress intensity from this point to the outside of the vessel. The vessel which has been subjected to elevated temperature autofrettage has a maximum stress intensity at the point $R_m = .675$, close to that for the standard autofrettaged vessel, but a fairly constant stress intensity throughout the vessel.

In other words, it is apparent that at design pressure, the elevated temperature autofrettaged vessel will be more efficient in that every portion of the vessel is more or less equally utilized, whereas, in the standard autofrettaged vessel, only a small portion of the vessel is utilized. This means that an elevated temperature autofrettaged vessel can retain a much greater design pressure (for a given thickness and material), or that for a given design pressure, the thicknesses involved will be substantially less.

This is shown in the following table, for a 10 inch inside diameter vessel.

TABLE

| | Autofrettage pressure (p.s.i.) | Outside diameter (inches) | Wall thickness (inches) | Design pressure (p.s.i.) | Volume/unit length, in.³/in |
|---|---|---|---|---|---|
| Elevated temperature autofrettage | 15,000 | 21.1 | 5.55 | 15,000 | 360 |
| Standard autofrettage | 61,300 | 52.5 | 21.25 | 15,000 | 2,650 |

The dramatic decrease in autofrettage pressure or fabrication pressure using the concepts of the invention over conventional autofrettage should be evident. At the same time there is a remarkable reduction in vessel wall thickness for a given design pressure, the savings in steel volume being in the order of 87 percent.

Although the invention has been described with reference to specific embodiments, variations within the scope of the claims will be apparent to those skilled in the art.

What is claimed is:

1. A method for fabricating a metallic vessel comprising the steps of
    subjecting the metallic vessel to an inside autofrettage pressure which is approximately equal to vessel design pressure;
    simultaneously heating the vessel approxiamtely to that temperature at which the yield strength of the vessel metal is reduced to vessel design stress intensity.

2. A method according to claim 1 wherein the design pressure $p_2$ is a ratio of vessel wall thickness in accordance with the equation $$p_2 = S_d \log_e 1/R_i$$

wherein:
    $R_i$ = ratio of vessel inside radius to vessel outside radius; and
    $S_d$ = vessel design stress intensity 3. A method according to claim 2 wherein the pressure and temperature are held for a short time.

4. A method according to claim 2 wherein said vessel is a solid wall vessel.

5. A method for fabricating a metallic vessel comprising the steps of
    subjecting the metallic vessel to an inside autofrettage pressure $p_1$ which is greater than vessel design stress intensity $S_d$ in accordance with the equation $$p_1 = S_d \log_e 1/R_i$$

wherein $R_i$ equals the ratio of the vessel inside radius to the vessel outside radius;
    simultaneously heating the vessel approximately to that temperature at which the yield strength of the vessel metal is reduced to at least the vessel design stress intensity.

6. A method for fabricating a metallic vessel for a predetermined design pressure $p_2$ comprising the steps of
    dimensioning the vessel in accordance with the equation $$p_2 = S_d \log_e 1/R_i$$

wherein:
        $R_i$ = ratio of vessel inside radius to vessel outside radius; and
        $S_d$ = vessel material design stress intensity;
    subjecting the metallic vessel to an inside pressure which is substantially equal to vessel design pressure;
    simultaneously heating the vessel approximately to that temperature at which the yield strength of the vessel metal is reduced to vessel design stress intensity.

7. A method according to claim 1 wherein the temperature and pressure are held for a short time until the vessel outside radius stops increasing at a measurable rate.

References Cited

UNITED STATES PATENTS

| | | | |
|---|---|---|---|
| 2,337,247 | 12/1943 | Kepler | 72—367 X |
| 2,372,723 | 4/1945 | Jasper | 29—446 |
| 3,064,344 | 11/1962 | Arne | 29—421 |
| 3,068,562 | 12/1962 | Long | 29—421 |
| 3,257,718 | 6/1966 | Krenzke | 29—404 |

THOMAS H. EAGER, *Primary Examiner.*

U.S. Cl. X.R.

29—421, 446; 72—367